United States Patent Office 3,424,550
Patented Jan. 28, 1969

3,424,550
PROCESS FOR THE MANUFACTURE OF MONOFLUOROPHOSPHORIC ACID AND ITS MONOESTERS
Rolf Wittmann, Darmstadt, Germany, assignor to E. Merck A.G., Darmstadt, Germany
No Drawing. Filed Jan. 20, 1966, Ser. No. 521,804
Claims priority, application Germany, Jan. 27, 1965, M 63,945
U.S. Cl. 23—50        14 Claims
Int. Cl. C01b 25/22; C08b 15/06, 19/00

ABSTRACT OF THE DISCLOSURE

In a process of monofluorinating a phosphoric acid compound with hydrogen fluoride, the improvement of conducting the reaction in the presence of (1) an acid-binding agent, e.g. a tertiary amine, and (2) a dehydrating compound, specifically a trihaloacetonitrile, a disubstituted carbodiimide, or mixtures thereof.

---

This invention relates in general to a novel process of producing monofluorophosphoric acid, its esters, and/or the salts of these compounds.

The manufacture of monofluorophosphoric acid and its esters has been possible up to now only by exceedingly difficult and complicated processes. Attempts have been made to produce monofluorophosphoric acid monoesters from polyphosphoric acid esters by cleaving the latter with hydrofluoric acid. Such reactions must be carried out at relatively low temperatures, i.e., $-40°$ C., and after a subsequent molecular distillation of the composite products, a very low yield of the desired product is obtained. According to another well-known process, monofluorophosphoric acid monoesters have been manufactured from mixed fluorinated phosphoryl chlorides. However, this process is encumbered by the fact that not only the manufacture of the intermediate phosphoric halide, but also the separation of the resulting fluorohalogen phosphoric acid esters involves numerous process difficulties.

In a more recent process involving the reaction of phosphoric acid or phosphoric acid monoesters with 2,4-dinitrofluorobenzene in the presence of tertiary bases, the product yields are high, but at the same time it is more difficult to separate the reaction products and it is necessary to use a relatively costly fluorine carrier.

It is therefore a principal object of this invention to provide an improved process of fluorinating phosphoric acid, the esters, or the salts thereof.

It is another object of this invention to provide an improved process of directly producing monofluorophosphoric acid, its monoesters, or the salts thereof.

It is still another object of the invention to employ hydrofluoric acid to produce directly monofluorophosphoric acid, the monoesters, or the salts thereof.

A still further object is to provide novel compositions of matter related to such compounds.

These and other objects and advantages of the invention will become apparent by reference to the accompanying description and claims appended hereto.

To attain these objectives, it was unexpectedly discovered that direct monofluorination of phosphoric acid, phosphoric acid monoesters, or their salts is possible with hydrofluoric acid, providing the reaction is conducted in the presence of a trihaloacetonitrile and/or a disubstituted carbodiimide and an acid-binding agent. Conversion by this reaction to the desired product is nearly quantitative and takes place smoothly. The reaction products can then be hydrolzed, and isolation of the components in the reaction mixture, as such, can be performed in the conventional manner.

It is particularly surprising that hydrofluoric acid, in the presence of either a trihaloacetonitrile or a disubstituted carbodiimide, results in the linkage of a fluorine atom directly to the phosphorus atom of phosphoric acid or its ester. Such a reaction is unforeseeable and could not have been predicted beforehand. Thus, there is provided a very economic process for the manufacture of monofluorophosphoric acid and its derivatives, having the additional advantage that the starting materials therefor are readily available.

It is assumed that one of the hydroxyl groups of the phosphoric acid or its derivatives, respectively, links intermediately with the dehydrating agent (the halogenated acetonitrile or substituted carbodiimide) to form an imido enol-phosphate which is subsequently split by the influence of the fluorine ions thus forming besides the monofluorophosphoric acid or its derivative, respectively, a substituted urea (if a carbodiimide was used) or a halogenated acetamide (if a halogenated acetonitrile was used).

Trihaloacetonitriles which may be used to perform the present invention are trichloroacetonitrile, tribromoacetonitrile and trifluoroacetonitrile, the first mentioned compound being the most easily available. As regards the disubstituted carbodiimides, all known compounds of this type may be used since the substituents do not play any part in the course of the reaction. The most commonly used carbodiimides are those substituted symmetrically by alkyl, aryl and aralkyl groups wherein the alkyl group may possibly be interrupted by NH-groups. Illustrative representatives of this type are, for example, dicyclohexylcarbodiimide, diisopropyl - carbodiimide, di - tert.-butyl-carbodiimide, di-n-propyl-carbodiimide, di-dodecyl-carbodiimide, bis - (4-diethylaminocyclohexyl)-carbodiimide, diphenylcarbodiimide, di-tolylcarbodiimide, dinaphthyl-carbodiimide, and di-phenanthrylcarbodiimide. Furthermore, also asymmetrically substituted carbodiimides have been described such as, for example, benzylphenyl - carbodiimide, tert. butylhexadecyl-carbodiimide, and isopropyl-tert.butylcarbodiimide.

The reaction temperatures for the process of this invention are generally between about $-10$ and $+150°$ C.; however, the reaction is preferably carried out at approximately 35–80° C. At lower reaction temperatures, the rate of reaction is correspondingly slower. As a rule, it is preferred that the reaction mixture be maintained at somewhat elevated temperatures (approximately between 35 and 80° C.) for at least two hours. If necessary, the reaction mixture can stand, with or without stirring, at room temperature (about 25° C.) for some time. It is especially desirable to let the reaction mass stand at room temperature for at least 12 hours.

The addition of a diluent is generally unnecessary. If desired, however, there may be added inert solvents, such as, for example, acetonitrile, pyridine, or dimethylformamide.

The tertiary amines, such as, for example, pyridine, collidine, lutidine, or trimethylamine and triethylamine, as well as tributylamine, are especially useful as acid-binding agents. Also suitable are, of course, tertiary amines with longer alkyl groups, for example those containing up to 12 carbon atoms.

Mixtures of acid-binding agents can also be used. Acid-binding agents are desirably employed in a ratio of 10 to 1, preferably 6 to 2 mols per mol of HF used.

The trihaloacetonitrile and the disubstituted carbodiimide, together, with the acid-binding agents, are advantageously added in molar amounts comparatively larger than either the phosphoric acid or the monoesters. Although the reaction can be conducted with equimolar or lesser amounts of these materials, it is desirable to employ 1 to 12, preferably 2 to 10 mols of the trihaloacetonitrile or the disubstituted carbodiimide per mol of the phosphoric acid or of its esters. The molar relationship between the trihaloacetonitrile or the disubstituted carbodiimide and acid-binding agent is generally 0.2 to 1, preferably 0.1 to 0.8.

An important advantage of this invention is that it has been found unnecessary to employ anhydrous hydrogen fluoride in the reaction; consequently, the reaction can even be carried out with an aqueous, e.g. 50% by weight, solution of hydrofluoric acid. In case much weaker concentrations of HF are used, the reaction proceeds more slowly; thus, concentrations of hydrofluoric acid no weaker than approximately 5–10% are generally desirable in this process. It is also desirable to use 1 to 10, preferably 2 to 8 mols of HF per mol of the phosphoric acid or its esters being halogenated.

The reaction mixture is then separated and purified in the usual way. As the free acids are relatively unstable, it is expedient to isolate them from the reaction mixture as alkali metal, ammonium, or cyclohexylammonium salts. The acid-binding agent can be removed by either washing or by extraction with an organic solvent. Often, it is advisable to incorporate an ion exchange cleaning step which is preferably conducted in a strongly acidic ion exchanger. The substances contained in the eluates are converted to alkali metal salts, particularly sodium salts, and separated in the usual manner.

According to the process of this invention, the monoesters of the phosphoric acid are converted into the corresponding monofluoro derivative or into salts thereof. The ester group, which does not play a direct part in the actual reaction, can comprise any ester moiety. This ester group is usually inert under the reaction conditions. Such a group can be an organic group, such as alkyl, aryl or aralkyl, which groups themselves can be varied by substituting thereon numerous substituents. The ester groups preferably do not contain more than 25 carbon atoms.

Nucleotides can also be used as phosphoric acid monoesters in the reaction. However, in the conversion of ribonucleotides with hydrofluoric acid and trichloroacetonitrile, a side reaction occurs during the formation of the corresponding monofluorophosphate. The trichloroacetonitrile reacts with the free hydroxyl groups of the ribose under the stated conditions to form the corresponding 2′,3′-O-(1-trichloro-2-amino)-ethylidene-nucleotide. These ethylidene compounds are stable substances under neutral conditions. However, the ethylidene residue is readily cleaved in the presence of dilute acids even at room temperature, and the nucleoside-5′-monofluorophosphate is produced in quantitative yields.

Hydrolysis of these ethylidene compounds can be carried out with dilute mineral acids, such as hydrochloric acid or sulfuric acid, or even with the aid of an acidic ion exchanger. When alkaline substances are used, cleavage of the ethylidene residue is generally slower. Thus, using 7 N ammonium hydroxide, for instance, formation of the nucleoside-5′-monofluorophosphates would take about 3–5 hours, at water bath temperatures ranging from 80 to 100° C. without the formation of by-products. However, with stronger bases utilized over longer periods, further hydrolysis products, such as nucleosides and nucleobases, are formed and even the fluorine-phosphorus bond is cleaved. It is unnecessary to isolate the ethylidene compound before hydrolysis. However, the above-described side reaction does not occur when dicyclohexylcarbodiimide is used instead of trichloroacetonitrile.

The reaction of free orthophosphoric acid with hydrofluoric acid in the presence of trihaloacetonitrile and/or disubstituted carbodiimide proceeds even after the monofluorophosphoric acid stage. The presence of excess hydrofluoric acid and condensing agent results in the formation of varying amounts of polyfluorinated phosphoric acids and in particular, the formation of the relatively unstable difluorophosphoric acid. All of these fluorophosphoric acids, however, can be converted, by hydrolysis, preferably in a weak alkaline medium (approximately pH value 8–9) into the corresponding salt of the monofluorophosphoric acid. The hydrolysis is desirably carried out at elevated temperatures, preferably at approximately water bath temperatures ranging from 80 to 100° C. Alkaline materials suitable for use in hydrolyzing the fluorophosphoric acids include solutions of sodium, potassium or ammonium hydroxide. The alkali metal fluoride resulting from the hydrolysis can be removed by extraction with methanol, for example, as the alkali metal monofluorophosphate which is only slightly soluble therein.

The monofluorophosphoric acid and its monoesters can be advantageously used in dentistry, for example, as additive in tooth pastes or similar preparations for prevention of caries. The nucleotides prepared according to the present invention are furthermore useful intermediates in the preparation of oligo-nucleotides because of the reactive fluorine substituent which enables the molecule to undergo condensations, for example with sugars or other nucleosides or nucleotides.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

0.2 mol phosphoric acid monomethylester, 0.4 mol triethylamine, 0.4 mol 50% hydrofluoric acid and 0.6 mol pyridine are mixed. The reaction mixture is warmed to about 60° C., and 0.6–0.8 mol trichloroacetonitrile are slowly added thereto with stirring. The reaction mixture is maintained at a temperature of 60° C. for 4 to 6 hours and is then allowed to stand at room temperature overnight. The pyridine is evaporated under reduced pressure; the resultant residue is dissolved in 0.2 mol aqueous NaOH and extracted with ether. The ether phase is washed with water. The aqueous phases are combined and passed through a strongly acidic ion exchanger. After neutralization with sodium hydroxide, the eluate is evaporated to dryness. The resultant dry residue is dissolved in methanol, and the remaining undissolved material is removed by filtration. The resultant filtrate is then mixed with ether to precipitate the sodium salt of the monofluorophosphoric acid methyl ester. The melting point of this ester is about 88° C. (Decomposition occurs at approximately 130° C.) Yield: 88%.

Example 2

8.7 g. monophenylester of phosphoric acid and 4 g. of 50% hydrofluoric acid are dissolved in 40 ml. pyridine. 28.6 g. trichloroacetonitrile are then added, drop by drop, at 60° C., with thorough stirring. After about 15 hours, the mixture is concentrated at a reduced pressure, and after the addition of 50 ml. 1 N NaOH, the mixture is extracted several times with ether. The water phase is neutralized in an acidic ion exchanger, filtered and evaporated to dryness at a reduced pressure. The dry residue is dissolved in methanol, filtered and fractionally precipitated with acetone/ether. A slight precipitation of symmetrical diphenylpyrophosphate is separated. The dissolved product in the filtrate is then precipitated with ether and dried. The melting point is 195–203° C. Yield: 9.2 g. (93%) of the monofluorophosphoric acid phenylester sodium salt.

The melting point of the corresponding potassium salt (neutralized with $K_2CO_3$) is 214–216° C.

The melting point of the corresponding cyclohexylammonium salt (neutralized with cyclohexylamine) is 148–149° C.

Example 3

8.7 g. monophenylester of phosphoric acid, 4 g., 50% hydrofluoric acid and 10.1 g. triethylamine are dissolved in 10 ml. pyridine. To this solution 20.6 g. N,N′-dicyclohexylcarbodiimide in 10 ml. pyridine is added dropwise at a temperature of 60–70° C. The reaction mixture is stirred for 6 hours at 60° C. and then for 12 hours at room temperature. Next, after the addition of 20 ml. water, the mixture is stirred for another hour. The precipitated urea is then filtered off and washed with water. The filtrate is evaporated to dryness under reduced pressure. The dry residue is dissolved in 30 ml. water and washed several times with low boiling petroleum ether (40–60° C.). The aqueous solution is passed through an acid ion exchanger and the eluate neutralized with NaOH. After concentration and dissolution of the residue in methanol, the monofluorophosphoric acid phenylester sodium salt is precipitated with acetone/ether. Yield: 9.5 g. (94%).

Example 4

3.64 g. adenosin-5'-monophosphoric acid monohydrate, 1.2 g. 50% hydrofluoric acid and 3 g. triethylamine are dissolved in 3 ml. pyridine. A solution of 6 g. N,N'-dicyclohexylcarbodiimide in 3 ml. pyridine is slowly added thereto, drop by drop, at 60° C. with stirring. Stirring is continued for 15 hours at 60° C.; the solvent is then evaporated under reduced pressure. The residue is dissolved in 30 ml. water, and byproduct precipitated urea is removed by vacuum filtration. The filtrate is mixed with 25 ml. 1 N NaOH, washed several times with ether and extracted to dryness under reduced pressure. The residue is dissolved in methanol and then precipitated with acetone. The centrifuged precipitate, together with the material obtained from the acetone filtrate yielded 3 g. monofluorophosphoric acid - 5' - adenosylester sodium salt (81%).

Neutralization can also be effected with ammonium hydroxide after treatment in an acidic ion exchanger, instead of with sodium hydroxide. The corresponding ammonium salt is then obtained, with a melting point of 168–170° C. By neutralization with cyclohexylamine, the cyclohexylammonium salt is obtained having a melting point of 140° C.

Example 5

1 g. crystalline orthophosphoric acid and 1.6 g. 50% hydrofluoric acid are dissolved in 20 ml. pyridine, and 14.4 g. trichloroacetonitrile are added thereto, drop by drop, at a temperature of 60° C. After 12 hours of stirring at 60° C., the solution is filtered and concentrated under reduced pressure. The residue is dissolved in water and filtered off from 4.5 g. trichloroacetamide. The filtrate is then adjusted to a pH of 8–9 with LiOH and extracted with ether. The aqueous phase is warmed for about 5–6 hours in a water bath, a pH of about 8 being observed. The warmed aqueous mixture is filtered off from a minor quantity of precipitated lithium phosphate and evaporated to dryness under reduced pressure. The residue is extracted with methanol and dried. Yield: 1.1 g. (95%) of the lithium salt of the monofluorophosphoric acid.

Example 6

(a) 18.5 g. adenosin-5'-monophosphoric acid monohydrate, 74 g. tri-N-butylamine and 15 g. 50% hydrofluoric acid are dissolved in 25 ml. pyridine. 50 ml. trichloroacetonitrile are added to this solution, drop by drop, at 60° C. with thorough stirring. The reaction mixture is maintained at 60° C. for 16 hours. The pyridine is then evaporated under reduced pressure; the residue is dissolved in 400 ml. 1 N NaOH and 200 ml. water, and washed several times with ether. The solution is brought, through the addition of 1 N NaOH, to a pH of 7 and evaporated to dryness under reduced pressure. The residue is dissolved in 100 ml. water, filtered and extracted with about 500 ml. water-saturated isobutanol. After evaporation of the solution, the residue is dissolved in methanol. The resultant solution is filtered and then ether is added thereto in order to precipitate the final product. Yield: 23 g. (86%) monofluorophosphoric acid-5'-[2',3'-O-(1-trichloro-2-amino)-ethylidene]-adenosylester sodium salt monohydrate, $\lambda_{max.}$ 258 m$\mu$ (pH 7).

(b) 5.3 g. monofluorophosphoric acid-5'-[2',3'-O-(1-trichloro-2-amino)-ethylidene]-adenosylester sodium salt monohydrate are dissolved in 150 ml. water and mixed with 20 g. of an acidic cation exchanger. After 3 hours of stirring at room temperature, the exchanger is filtered off, washed with water, and the resultant filtrate is neutralized with sodium hydroxide. After concentration under reduced pressure, the neutralized residue is dissolved in methanol, filtered and precipitated with ether. On drying, 3.4 g. (92%) monofluorophosphoric acid-5'-adenosylester sodium salt is obtained.

Example 7

(a) 0.37 g. uridin-5'-monophosphoric acid disodium salt, 1.48 g. tri-N-butylamine and 0.3 g. 50% hydrofluoric acid are dissolved in 1 ml. pyridine. During the course of one hour, 1 ml. trichloroacetonitrile is added, drop by drop, at 60° C. with stirring. The reaction mixture is stirred for 14 hours at 60° C.; the pyridine is then evaporated under reduced pressure, the resultant residue is dissolved in 20 ml. water; and the obtained solution is extracted with ether. The tri-N-butylamine is removed by the addition of 10 ml. 1 N NaOH and extracted with ether. The aqueous solution is reduced to a volume of about 15 ml. and extracted with water-saturated isobutanol. After removal of the isobutanol under reduced pressure, the residue is dissolved in methanol, and the obtained solution is filtered and then treated with ether to obtain 0.445 g. (97%) monofluorophosphoric acid-5'-[2',3'-O-(1-trichloro - 2-amino)-ethylidene]-uridylester sodium salt as the monohydrate, $\lambda_{max.}$ 260.5 m$\mu$ (pH 7).

(b) 0.255 g. monofluorophosphoric acid, 5'-[2',3'-O-(1-trichloro-2-amino)-ethylidene]-uridylester sodium salt monohydrate are warmed in 10 ml. 7 N ammonium hydroxide for about 4 hours at 50–60° C. The reaction mixture is evaporated to dryness under reduced pressure. The dry residue is dissolved in 10 ml. water and passed through an acidic ion exchanger. The eluate is neutralized with NaOH, evaporated to dryness and the residue dissolved in methanol. 0.358 g. (98% monofluorophosphoric acid-5'-uridylester sodium salt monohydrate is precipitated with ether.

Example 8

(a) 1 g. guanosin-5'-monophosphoric acid disodium salt trihydrate, 3.94 g. tri-N-butylamine and 0.796 g. 50% hydrofluoric acid are dissolved in 3 ml. pyridine, and 2.6 ml. trichloroacetonitrile are added, drop by drop, to the solution at 60° C. with stirring. The reaction mixture is worked up as in Example 7. Yield: 0.89 g. (84.5%) monofluorophosphoric acid - 5'-[2',3'-O-(1-trichloro - 2-amino)-ethylidene]-guanosylester ammonium salt, $\lambda_{max.}$ 254 m$\mu$ (pH 7).

(b) 0.526 g. of the ammonium salt of monofluorophosphoric acid - 5'-[2',3'-O-(1-trichloro - 2-amino)-ethylidene]-guanosylester are warmed in 10 ml. 7 N ammonium hydroxide for about 4 hours at 50–60° C. After evaporation at reduced pressure the residue is dissolved in methanol. 0.37 g. (97%) of the ammonium salt of the monofluorophosphoric acid-5'-guanosylester are precipitated from the filtered solution by the addition of ether.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be, within the full range of equivalence of the following claims.

What is claimed is:

1. In a process for the manufacture of a member selected from the group consisting of a monofluorophosphoric acid, a monoester thereof, a salt of the acid and a salt of the ester, comprising the step of reacting a phosphoric acid compound selected from the group consisting of phosphoric acid, a monoester thereof, a salt of the monoester, and a salt of the phosphoric acid with hydrofluoric acid, the improvement comprising conducting said reacting in the presence of an acid-binding agent and a dehydrating compound selected from the group consisting of trichloroacetonitrile, tribromoacetonitrile, trifluoroacetonitrile, a disubstituted carbodiimide and mixtures thereof.

2. A process as defined by claim 1, comprising a further step of reacting a member selected from the group consisting of monofluorophosphoric acid, its monoesters, and salts of these compounds with an alkaline material selected from the group consisting of an alkali metal base, an ammonium base, and a cyclohexylammonium base, and separating the resultant salt from the reaction mixture.

3. A process as defined by claim 1 wherein the disubstituted carbodiimide is a carbodiimide substituted by an alkyl, aryl or aralkyl group.

4. A process as defined by claim 1 wherein the disubstituted carbodiimide is dicyclohexylcarbodiimide.

5. A process as defined by claim 1 wherein the acid-binding agent is a tertiary amine.

6. A process as defined by claim 1 wherein the phosphoric acid monoester is a nucleotide.

7. The process of claim 1 wherein one to ten mols of HF are used per mol of the phosphoric acid compound.

8. The process of claim 1 wherein 10 to 1 mols of the acid-binding agent are used per mol of HF.

9. The process of claim 1 wherein 1 to 6 mols of said dehydrating compound are used per mol of the phosphoric acid compound.

10. A process as defined by claim 1 wherein the acid-binding agent is a tertiary amine selected from the group consisting of pyridine, collidine, lutidine, trimethylamine, triethylamine, and tributylamine; and the hydrogen fluoride is employed in an aqueous solution thereof.

11. A process as defined by claim 1 further comprising the step of hydrolyzing the reaction product obtained in the fluorination of orthophosphoric acid in an aqueous alkaline medium having a pH value of about 8–9.

12. A process as defined by claim 1, wherein said dehydrating compound is said disubstituted carbodiimide.

13. A process as defined by claim 1, wherein 1–10 mols of HF are employed per mol of said phosphoric acid compound, said acid-binding agent is selected from the group consisting of pyridine, collidine, lutidine, and a tertiary alkyl amine of up to 12 carbon atoms, and said dehydrating compound is selected from the group consisting of trichloroacetonitrile; tribromoacetonitrile; trifluoroacetonitrile; dicyclohexylcarbodiimide, disopropyl-carbodiimide, di-tert.butyl-carbodiimide, di-n-propyl-carbodiimide, di-dodecyl-carbodiimide, bis-(4-diethylaminocyclohexyl)-carbodiimide, di-phenylcarbodiimide, di-tolyl-carbodiimide, di-naphthyl-carbodiimide, di-phenanthryl-carbodiimide, benzyl-phenyl-carbodiimide, tert.butylhexadecyl-carbodiimide, and isopropyl-tert.butylcarbodiimide, and mixtures thereof.

14. A process as defined by claim 1 wherein said phosphoric acid compound is a ribonucleotide and said dehydrating compound is trichloroacetonitrile; and comprising a further step of subjecting the reaction product to hydrolysis.

References Cited

UNITED STATES PATENTS

| | | | |
|---|---|---|---|
| 2,408,784 | 10/1946 | Lange et al. | 23—139 |
| 2,481,807 | 9/1949 | Anderson | 23—50 |

OTHER REFERENCES

Ozark Chemicals Bulletin FPA–1, "Monofluorophosphoric Acid-Difluorophosphoric Acid," Ozark Chemical Co., Tulsa, Okla., 1944, pp. 1, 4 and 5 cited.

EARL C. THOMAS, *Primary Examiner.*

HERBERT T. CARTER, *Assistant Examiner.*

U.S. Cl. X.R.

23—139; 260—920, 211.5